March 17, 1953 H. J. HAMMERLY ET AL 2,632,039
PANELBOARD CONSTRUCTION
Filed Sept. 14, 1950 2 SHEETS—SHEET 1
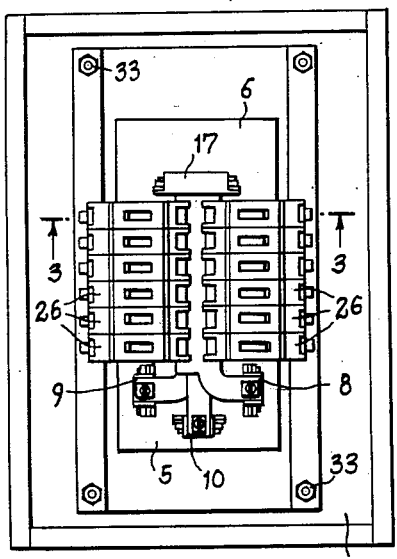
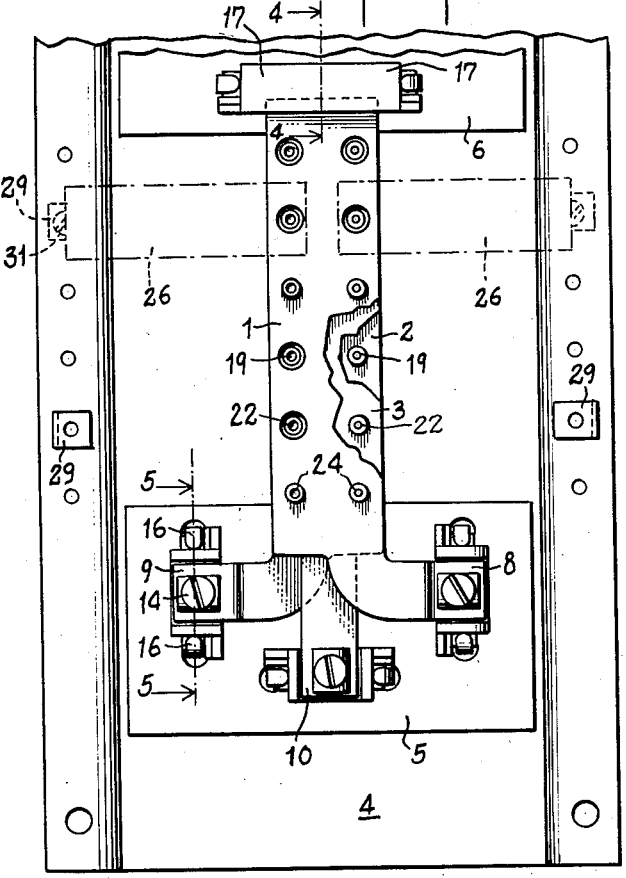
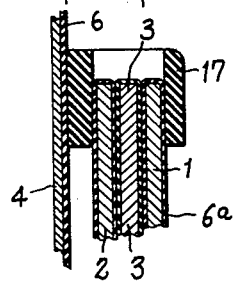
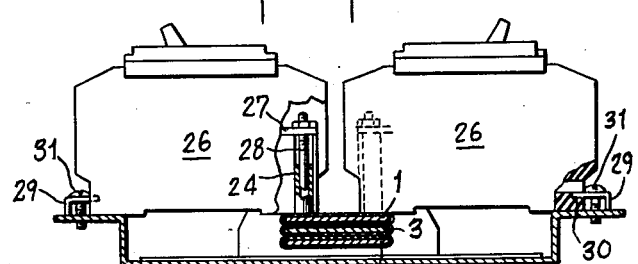
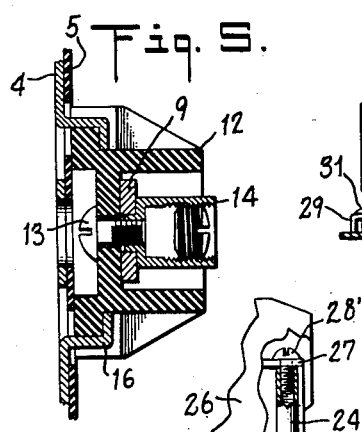
Inventors
Herman J. Hammerly.
Charles Bangert, Jr.
by
Their Attorney.

March 17, 1953
H. J. HAMMERLY ET AL
2,632,039
PANELBOARD CONSTRUCTION
Filed Sept. 14, 1950
2 SHEETS—SHEET 2
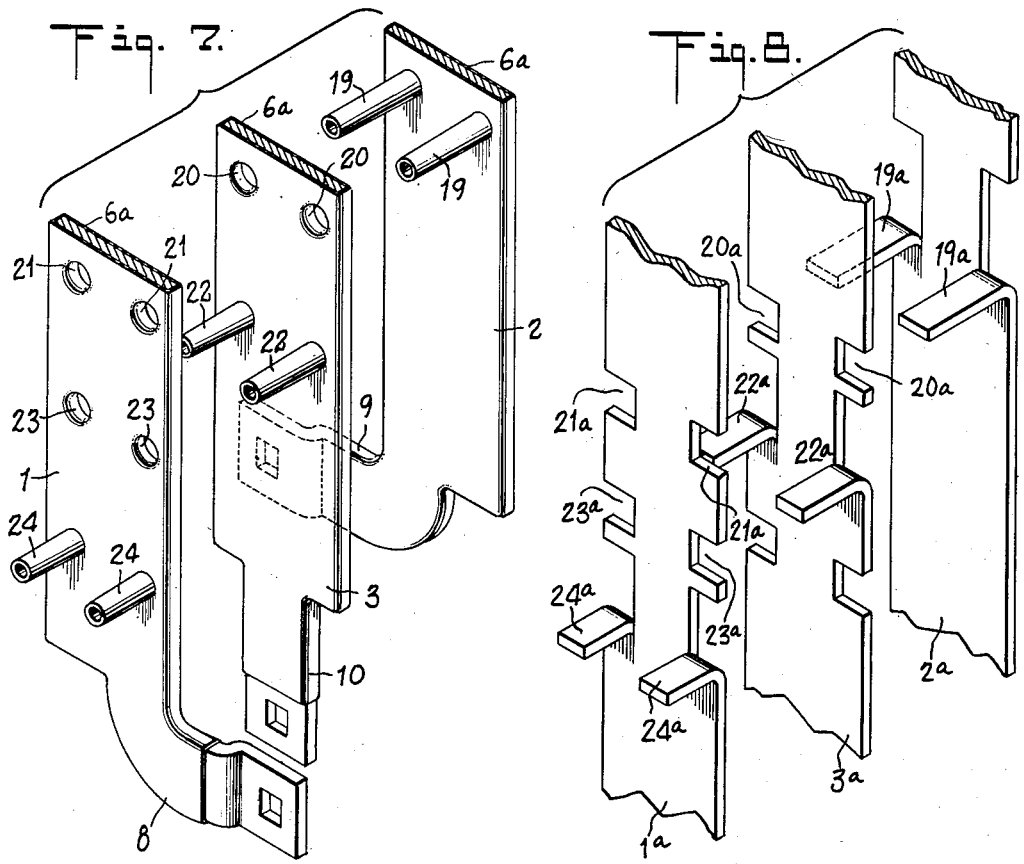
Inventors
Herman J. Hammerly
Charles Bangert, Jr.
by
Their Attorney Patented Mar. 17, 1953

2,632,039

UNITED STATES PATENT OFFICE 2,632,039

PANEL BOARD CONSTRUCTION

Herman J. Hammerly, Plainville, and Charles Bangert, Jr., New Britain, Conn., assignors, by mesne assignments, to General Electric Company, a corporation of New York Application September 14, 1950, Serial No. 184,752

2 Claims. (Cl. 175—308)

Our invention relates to apparatus in the nature of a control center where provision is made for distribution of power through a number of electrical devices, such as circuit breakers.

Our invention has for its main object to provide a simple but compact distribution panelboard which may be housed in a wall box or cabinet provided with the usual front plate and having a door providing access to a number of circuit breakers mounted edge to edge.

According to our invention, a number of insulated bus bars are stacked one upon another in a supporting pan or tray and provided with offset line terminals spread apart and readily accessible for wiring. Each bus bar has a number of extensions for connection with circuit breakers in the branch circuits.

Fig. 1 is a front view of a panelboard embodying our invention showing it mounted on a wall box or cabinet and showing breaker units in place.

Fig. 2 is a front view of the front of the panelboard on a larger scale and omitting the breaker units, parts being shown broken away.

Fig. 3 is a horizontal sectional view of the panelboard support on the plane of the line 3—3 of Fig. 1 and showing two breaker units, one partly broken away.

Fig. 4 is a fragmentary sectional view on the plane of the line 4—4 of Fig. 2.

Fig. 5 is a fragmentary sectional view on the plane of the line 5—5 of Fig. 2.

Fig. 6 is a fragmentary sectional view similar to a part of Fig. 3 but showing a modified connection between a breaker unit and a bus bar.

Fig. 7 is an enlarged exploded perspective view showing the lower line terminal ends of three bus bars.

Fig. 8 is an enlarged exploded perspective view of three bus bars of modified form.

Fig. 7 shows an assembly of straight strap shaped bus bars with bus bar 1 at the front and bus bar 2 at the rear and bus bar 3 between the front and rear bus bars. All of the bus bars are mounted in flatwise stacked relation within a pan or tray 4 upon insulating supports 5 and 6. The bus bars are provided with offset and spaced apart wiring terminals 8, 9 and 10, respectively, at their lower ends. Each bus bar is coated with insulating material 6a except at the ends where the wiring terminals are connected.

The wiring terminal 9 of bus bar 2 is shown mounted in an insulating housing 12 to which it is detachably secured by a screw 13 coacting with a clamp screw 14. This housing 12 is positioned on the support 5 and clamped thereto by lugs 16. The terminals 8 and 10 are similarly supported in the tray or pan.

The upper ends of the bus bars are supported in an insulating housing 17.

The rear bus bar 2 has two electrically conducting circuit breaker connection extensions 19, 19 at its top which pass freely through top passages 20, 20 in intermediate bus bar 3 and through aligned passages 21, 21, in front bus bar 1. Similarly bus bar 3 has two extensions 22, 22 midway its ends which extend through center passages 23, 23 in bus bar 1.

Bus bar 1 is provided with extensions 24, 24 at its bottom end.

When the bus bars are stacked, all the extensions extend outwardly of the front bus bar 1 in order to connect the bus bars with the circuit terminals of the circuit breakers 26, 26. These circuit breakers may be of any suitable type normally provided with manually operable means for opening and closing the circuit and with automatically tripping mechanism (not shown).

Each of the circuit breakers has a circuit terminal 27 adapted to register with one of the bus bar extensions such as 24 as shown in Fig. 3. In this figure a circuit terminal 27 is shown connected to one of the tubular bus bar extensions such as 24 by a split pin connection plug 28 having its upper end in threaded engagement with the terminal 27 and secured thereto by a lock nut.

Opposite each of the extensions is a clamping clip 29 which extends into a recess 30 in the outer edge of the circuit breaker 26 and a screw 31 is provided for fastening each clip to a flange of the supporting tray.

In the form shown in Fig. 6, the extension 24 connects one of the bus bars with a circuit terminal 27 of a circuit breaker and a screw 28' draws the terminal 27 of the circuit breaker into connection with the extension 24.

It will thus be seen that a circuit breaker is detachably secured to the tray by a single plug-in extension and an oppositely disposed clip 29 and screw 31.

The supporting pan may be secured in place in the cabinet 32 by fastening members 33.

In the form of bus bars shown in Fig. 8, the bus bars 1a, 2a and 3a correspond with bus bars 1, 2 and 3, respectively, previously described. These bus bars are provided with integral terminal plug-in blades 19a, 19a, 22a, 22a, and 24a, 24a, respectively which serve as supports for the circuit breakers. Cut-out portions or passages 20a, 20a, 21a, 21a and 23a, 23a correspond with the passages 20, 20, 21, 21 and 23, 23, respectively, and the blades 24a correspond with the extensions 24 of Fig. 7.

It will be understood that the upper and lower ends of the bus bars of Fig. 8 will be provided with supports similar to the supports of the bus bars in Figs. 1, 2 and 3.

We claim:

1. A panelboard construction comprising a support, front and rear strap-shaped bus bars arranged in flatwise stacked relation, a layer of electrically insulating material between said bus bars, a line terminal on each of said bus bars, electrically insulating supporting means securing said bus bars on said support, said front bus bar being provided with a plurality of apertures, a plurality of circuit breaker plug connection terminals secured to each of said bus bars and projecting laterally therefrom, the terminals on said rear bus bar extending through said apertures in said front bus bar in insulated relation with said front bus bars, and fastening means on said support for securing the ends of circuit breakers electrically connected to said terminals.

2. A panelboard construction comprising a supporting tray, a group of three strap-shaped bus bars arranged in flatwise stacked relation, a layer of electrically insulating material surrounding each of said bus bars, a line terminal on one end of each of said bus bars and on the same end of said group of bus bars, electrically insulating supporting means securing each of said line terminals to said tray thereby to support said bus bars each at one end, electrically insulating means for securing the opposite ends of said bus bars to said tray, the front and intermediate bus bars being provided each with a plurality of apertures and the apertures in said intermediate bus bar being in alignment with certain of the apertures in said front bus bar, a plurality of circuit breaker plug connection terminals secured to each of said bus bars and projecting laterally therefrom, the terminals on the intermediate and rear bus bars extending through certain of said apertures in said front and intermediate bus bars, and fastening means on a side of said tray for securing the ends of circuit breakers electrically connected to said terminals.

HERMAN J. HAMMERLY.
CHARLES BANGERT, Jr.

REFERENCES CITED

The following references are of record in the file of this patent:

UNITED STATES PATENTS

| Number | Name | Date |
|---|---|---|
| 1,203,582 | Chase | Nov. 7, 1916 |
| 1,657,249 | Eby | Jan. 24, 1928 |
| 1,902,790 | Starrett | Mar. 21, 1933 |
| 1,935,313 | Feldman | Nov. 14, 1933 |
| 1,939,130 | Mills | Dec. 12, 1933 |
| 1,999,137 | Flewelling | Apr. 23, 1935 |
| 2,006,436 | Bowers | July 2, 1935 |
| 2,530,548 | Stanley | Nov. 21, 1950 |